(12) United States Patent  
Li

(10) Patent No.: US 12,392,398 B2  
(45) Date of Patent: Aug. 19, 2025

(54) PLANETARY ROLLER SCREW LINEAR ACTUATOR

(71) Applicant: AAC Acoustic Technologies (Shanghai) Co., Ltd., Shanghai (CN)

(72) Inventor: Chunjiang Li, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/402,691

(22) Filed: Jan. 2, 2024

(65) Prior Publication Data

US 2024/0401678 A1 Dec. 5, 2024

Related U.S. Application Data

(63) Continuation of application No. PCT/CN2023/101321, filed on Jun. 20, 2023.

(30) Foreign Application Priority Data

Jun. 5, 2023 (CN) .......................... 202310658578.5

(51) Int. Cl.  
*F16H 25/22* (2006.01)  
*F16H 25/24* (2006.01)  
*G01D 5/20* (2006.01)  
*F16H 25/20* (2006.01)

(52) U.S. Cl.  
CPC ......... *F16H 25/2252* (2013.01); *F16H 25/24* (2013.01); *G01D 5/20* (2013.01); *F16H 2025/2031* (2013.01); *F16H 2025/2078* (2013.01)

(58) Field of Classification Search  
CPC ......... F16H 25/2015; F16H 2025/2078; F16H 2025/2031; F16H 25/2252  
See application file for complete search history.

(56) References Cited

U.S. PATENT DOCUMENTS

| | | | | | |
|---|---|---|---|---|---|
| 2,918,827 | A | * | 12/1959 | Brown | F16H 25/229 475/183 |
| 9,520,756 | B2 | * | 12/2016 | Fedosovsky | H02K 7/06 |
| 10,461,606 | B2 | * | 10/2019 | Ognibene | B62D 5/0403 |
| 10,900,583 | B2 | * | 1/2021 | Gagliano | F16K 37/005 |
| 11,239,731 | B2 | * | 2/2022 | Kuhn | H02K 11/0141 |

\* cited by examiner

*Primary Examiner* — Gregory Robert Weber  
(74) *Attorney, Agent, or Firm* — Wiersch Law Group

(57) ABSTRACT

A planetary roller screw linear actuator includes a shell with a receiving cavity, a driving assembly fixed in the receiving cavity, and a rotor received in the receiving cavity and driven by the driving assembly to rotate. The rotor includes a hollow shaft rotatably connected to two ends of the shell, a planetary screw rotating body in transmission connection to the shaft, and an extension rod in transmission connection to the planetary screw. The shaft is made of a magnetic material. A detection position magnet is fixed to an end of the shaft and an induction assembly is fixed to the shell and spaced from the magnet. An axial projection of the magnet is located in the shaft. A magnetic field of the magnet is not affected by an external magnetic field, and a position of the rotor is accurately determined.

10 Claims, 3 Drawing Sheets

PLANETARY ROLLER SCREW LINEAR ACTUATOR

TECHNICAL FIELD

The present invention belongs to the technical field of linear actuators, and in particular, to a planetary roller screw linear actuator.

BACKGROUND

A planetary roller screw, also known as a planetary roller screw or satellite roller screw, is a low-friction precision screw transmission apparatus, and is a mechanical apparatus that converts rotational motion into linear motion or vice versa. The planetary roller screw is used as an actuator in various electromechanical linear actuators.

In the related art, a sensor is installed at an outer side of a circumference of a motor shaft, whose accuracy is affected under an influence of a magnetic field of the motor. Moreover, the sensor is a switch-type Hall or resolver or encoder in most cases, with a large volume and low reliability.

SUMMARY

An objective of the present invention is to provide a planetary roller screw linear actuator, in which a magnetic field of a detection position magnet is not easily affected and a position of the magnet can be accurately reflected, thereby accurately determining a position of a rotor of the linear actuator.

An embodiment of the present provides a planetary roller screw linear actuator, including: a shell having a receiving cavity; a driving assembly fixed in the receiving cavity; and a rotor received in the receiving cavity and driven by the driving assembly to rotate, the rotor including a hollow shaft rotatably connected to two ends of the shell, a planetary screw rotating body in transmission connection to the hollow shaft, and an extension rod in transmission connection into the planetary screw. The hollow shaft is made of a magnetic material, the linear actuator further includes: a detection position magnet fixed to an end of the hollow shaft away from an extension direction of the extension rod, and an induction assembly fixed to the shell and spaced apart from the detection position magnet; and an axial projection of the detection position magnet is located in the hollow shaft.

As an improvement, the rotor further includes a shaft end support fixed to an end of the hollow shaft, the shaft end support is made of a non-magnetic material, and the detection position magnet is fixed to the shaft end support.

As an improvement, the detection position magnet at least partially extends into the hollow shaft.

As an improvement, the linear actuator further includes a bearing bracket fixed to an end of the shell, and a first bearing including an outer ring that is fixed to the bearing bracket and an inner ring that sleeves and is fixed to and an outer side of the hollow shaft; and the induction assembly includes a printed circuit board (PCB) fixed to the bearing bracket, and a magnetic field induction position sensor fixed to the PCB.

As an improvement, an inner side of the bearing bracket is provided with an embedding groove, and the first bearing is embedded in the embedding groove with an outer side of the first bearing abutting against a groove wall of the embedding groove; and the linear actuator further includes a first end cap fixed to the shell and abutting against a side of the bearing bracket away from the rotor.

As an improvement, the bearing bracket has a hollow structure, the first end cap is provided with an outlet hole communicated with the receiving cavity, and an edge of the outlet hole protrudes outwards to form a reinforced edge.

As an improvement, the bearing bracket is provided with a plurality of through holes surrounding an outer side of the PCB and spaced apart from one another.

As an improvement, the linear actuator further includes a second bearing and a second end cap; and the second bearing includes an inner ring that sleeves an outer side at an end of the hollow shaft close to the extension direction of the extension rod and an outer ring that is fixed to the shell, and the second end cap is fixed to an end of the shell and abuts against an outer side of the second bearing.

As an improvement, the hollow shaft protrudes radially to form a shaft shoulder retainer surrounding an outer side thereof, the inner ring of the second bearing abuts against an outward side of the shaft shoulder, and the linear actuator further includes a retainer nut that is fixed to an end of the hollow shaft and abuts against a side of the inner ring of the second bearing away from the shaft shoulder retainer.

As an improvement, an outer wall of the shaft shoulder retainer and an outer wall of the retainer nut are each provided with a limiting surface.

The present invention has the following beneficial effects. The hollow shaft, the planetary screw rotating body, and the extension rod constitute a planetary roller screw, the driving assembly is configured to drive the hollow shaft to rotate, and the hollow shaft drives the planetary screw rotating body to move, so as to drive the extension rod to stretch out and draw back linearly. The hollow shaft is made of a magnetic material, and the detection position magnet is assembled at an end of the hollow shaft and an axial projection thereof is located in the hollow shaft. In this way, the hollow shaft shields outside magnetic fields, making magnetic fields inside and at ends of the hollow shaft pure. A magnetic field of the detection position magnet is affected by an external magnetic field, and a specific position of the detection position magnet can be accurately detected by the induction assembly, thereby accurately determining a position of the rotor of the linear actuator.

DESCRIPTION OF EMBODIMENTS

The present invention is further described below with reference to the accompanying drawings and embodiments.

Figure 1:
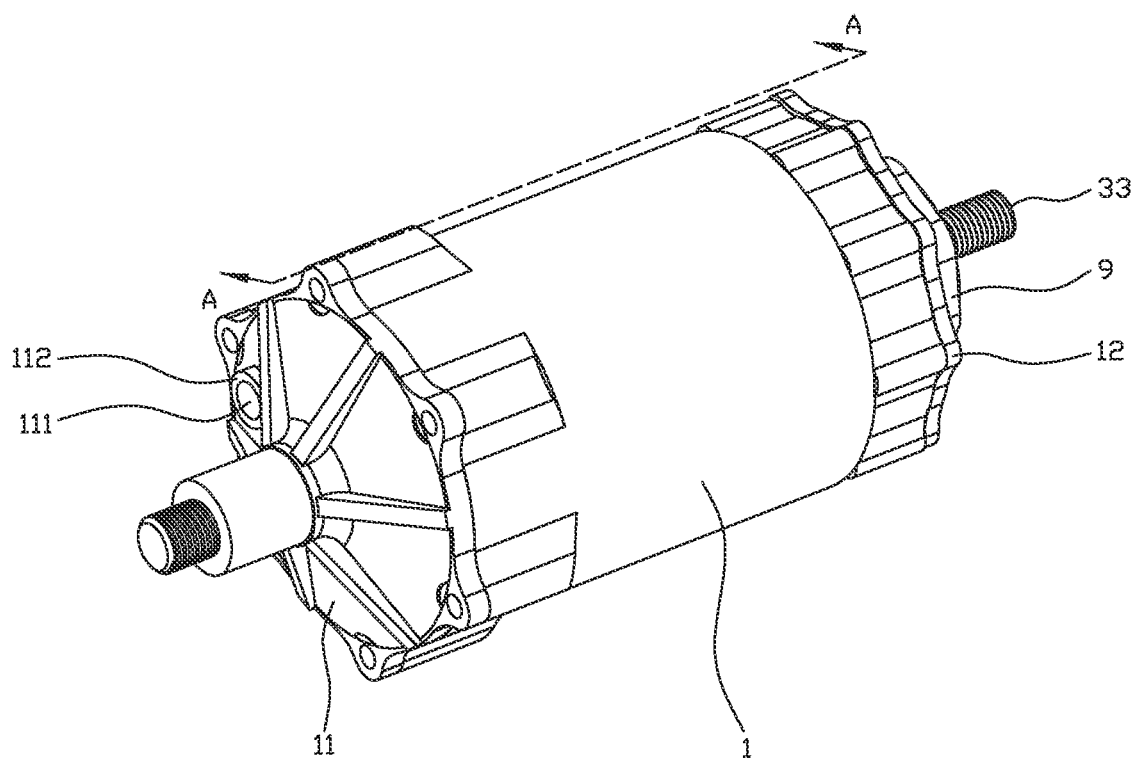
FIG. 1 is a schematic diagram of an entire structure of a planetary roller screw linear actuator according to an embodiment of the present invention.
Figure 2:
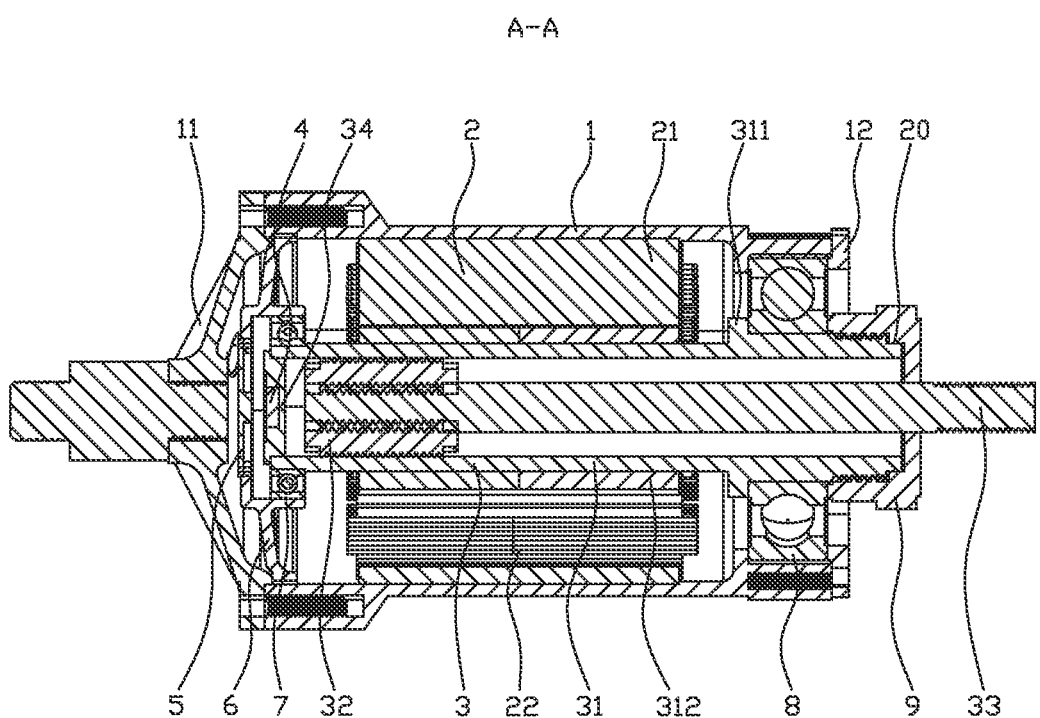
FIG. 2 is a sectional view of the planetary roller screw linear actuator taking along A-A shown in FIG. 1 according to an embodiment of the present invention.
Figure 3:
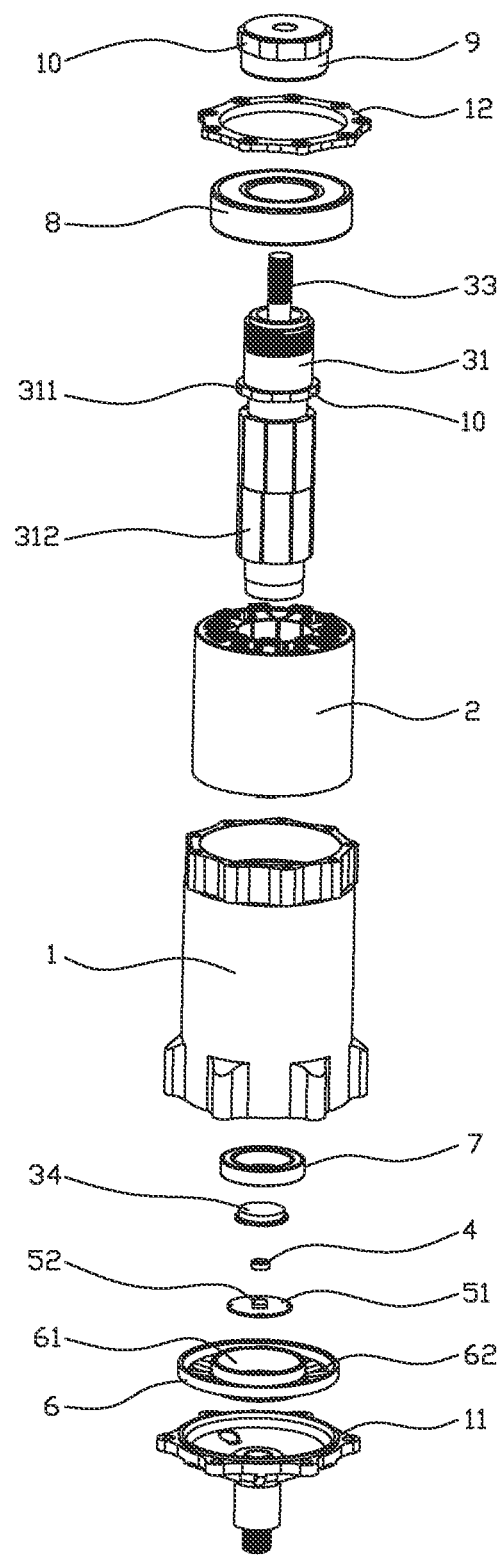
FIG. 3 is a schematic three-dimensional exploded view of a planetary roller screw linear actuator according to an embodiment of the present invention.

Referring to FIG. 1 to FIG. 3, a planetary roller screw linear actuator is provided, and includes: a shell 1 with a receiving cavity, a driving assembly 2 fixed in the receiving cavity, and a rotor 3 received in the receiving cavity and driven by the driving assembly 2 to rotate. The rotor 3 includes a hollow shaft 31 rotatably connected to two ends of the shell 1, a planetary screw rotating body 32 in transmission connection to the hollow shaft 31, and an extension rod 33 in transmission connection to a planetary screw. The hollow shaft 31 is made of a magnetic material. The linear actuator further includes: a detection position magnet 4 that is fixed to an end of the hollow shaft 31 away from an extension direction of the extension rod 33, and an induction assembly 5 that is fixed to the shell 1 and spaced apart from the detection position magnet 4. An axial projection of the detection position magnet 4 is located in the hollow shaft 31.

In this embodiment, the hollow shaft 31, the planetary screw rotating body 32, and the extension rod 33 constitute a planetary roller screw. The driving assembly 2 is configured to drive the hollow shaft 31 to rotate, and the hollow shaft 31 drives the planetary screw rotating body 32 to move, so as to drive the extension rod 33 to stretch out and draw back linearly. The hollow shaft 31 is made of a magnetic material, and the detection position magnet 4 is assembled at an end of the hollow shaft 31 and an axial projection thereof is located in the hollow shaft 31. In this way, the hollow shaft 31 shields outside magnetic fields, making magnetic fields inside and at ends of the hollow shaft 31 pure. A magnetic field of the detection position magnet 4 is affected by an external magnetic field, and a specific position of the detection position magnet 4 can be accurately detected by the induction assembly 5, thereby accurately determining a position of the rotor 3 of the linear actuator.

In this embodiment, the hollow shaft 31 is in a shape of a circular tube, and as a shell nut of the planetary roller screw, it is provided therein with multiple threads. The planetary screw rotating body 32 includes a plurality of screws surrounding the extension rod 33, and each screw meshes with an inner side of the hollow shaft 31 and an outer side of the extension rod 33. A plurality of permanent magnets 312 surrounding a periphery of the hollow shaft 31 are fixed to an outer side of the hollow shaft 31, and the driving assembly 2 includes a stator support 21 that is fixed at an inner side of the shell 1 and sleeves the hollow shaft 31, and a plurality of windings 22 wound on the stator support 21 and surrounding a periphery of the rotor 3. In this way, the driving assembly 2 can drive the rotor 3 to rotate so as to drive the extension rod 33 to stretch out and draw back. Since the permanent magnet 312 and the driving assembly 2 are both at the outer side the hollow shaft 31 and the hollow shaft 31 is made of a magnetic material and can shield magnetic fields of the permanent magnet 312 and the driving assembly 2, a magnetic field environment of the detection position magnet 4 is pure, and thus position detection is more accurate.

Further, the rotor 3 further includes a shaft end support 34 fixed to an end of the hollow shaft 31, the shaft end support 34 is made of a non-magnetic material, and the detection position magnet 4 is fixed to the shaft end support 34. In an example, the shaft end support 34 is embedded into an end of the hollow shaft 31. The shaft end support 34 may be fixed by being installed with internal threads of the hollow shaft 31, or may be fixed to an end portion of the hollow shaft 31 by gluing or injection molding. The detection position magnet 4 is embedded at a middle portion of the shaft end support 34, with magnetic poles arranged in a radial direction of the shaft end support 34.

In order to ensure a shielding effect of the external magnetic field, the detection position magnet 4 at least partially extends into the hollow shaft 31. In an embodiment, a part of the detection position magnet 4 is within an end surface of the hollow shaft 31 and another part of the detection position magnet 4 is outside the end surface of the hollow shaft 31, thereby achieving a good magnetic field shielding effect. In some embodiments, the detection position magnet 4 may be completely within the end surface of the hollow shaft 31. It should be understood that the detection position magnet 4 may also be completely outside the end surface of the hollow shaft 31, as long as it is still within a shielding range of the hollow shaft 31 from the external magnetic field.

Further, the linear actuator further includes: a bearing bracket 6 fixed to an end of the shell 1, and a first bearing 7 with an outer ring fixed to the bearing bracket 6 and an inner ring that is fixed to and sleeves an outer side of the hollow shaft 31. The induction assembly 5 includes a PCB 51 fixed to the bearing bracket 6 and a magnetic field induction position sensor 52 fixed to the PCB 51. In an example, the PCB 51 is fixed to a middle region of the bearing bracket 6, and the magnetic field induction position sensor 52 faces the detection position magnet 4. A Hall sensor may be adopted as the magnetic field induction position sensor 52.

Further, an inner side of the bearing bracket 6 is provided with an embedding groove 61, and the first bearing 7 is embedded in the embedding groove 61 with an outer side of the first bearing 7 abutting against a groove wall of the embedding groove 61. The linear actuator further includes a first end cap 11 fixed to the shell 1 and abutting against a side of the bearing bracket 6 away from the rotor 3. In an example, the first end cap 11 may be assembled with the shell 1 by screws, the first end cap 11 and the bearing bracket 6 form a double front end cap structure, the bearing bracket 6 can transfer a radial force to the first bearing 7 and position radial positions of the first bearing 7 and the hollow shaft 31, and the first end cap 11 abuts against an outer side of a bearing end cap to provide an axial push-pull force to the first bearing 7, with an accurate position and a reliable transmission effect.

Further, the bearing bracket 6 has a hollow structure, and the first end cap 11 is provided with an outlet hole 111 communicated with the receiving cavity. An edge of the outlet hole 111 protrudes outwards to form a reinforced edge 112. In an example, the bearing bracket 6 is provided with a plurality of through holes 62 surrounding an outer side of the PCB 51 and spaced apart from one another. In this way, the windings 22 in the driving assembly 2 can be routed through the through hole 62 and the outlet hole 111. The arrangement of the reinforced edge 112 at the outlet hole 111 can improve strength without reducing strength of the end cap. In order to facilitate the wiring, a limiting position may be provided at a side of the bearing bracket 6 close to the driving assembly 2 to fix a wire concentrator of the linear actuator. The wire concentrator is configured for grouped connections of wires of the windings 22, to fix outgoing wires of the windings 22 and balance resistance of each phase thereof. Certainly, a wire-concentrator bracket may be provided at an outlet end of the driving assembly 2 for the grouped connections of the wires of the windings 22.

Further, the linear actuator further includes a second bearing 8 with an inner ring that sleeves an outer side at an end of the hollow shaft 31 close to the extension direction of the extension rod 33 and an outer ring fixed to the shell 1, and a second end cap 12 fixed to an end of the shell 1 and abutting against an outer side of the second bearing 8. Through cooperation of the first bearing 7 and the second bearing 8, reliable rotation of the rotor 3 can be achieved.

Further, the hollow shaft 31 protrudes radially to form a shaft shoulder retainer 311 surrounding an outer side thereof, the inner ring of the second bearing 8 abuts against an outward side of the shaft shoulder, and the linear actuator further includes a retainer nut 9 fixed to an end of the hollow shaft 31 and abutting against a side of the inner ring of the second bearing 8 away from the shaft shoulder retainer 311. That is, inner and outer sides of the inner ring of the second bearing 8 are clamped by the shaft shoulder retainer 311 and the retainer nut 9 respectively, to ensure a positional relationship between the second bearing 8 and the hollow shaft 31, and the outer ring of the second bearing 8 is fixed by the shell 1 and the second end cap 12. In this way, a radial position and an axial position of the hollow shaft 31 can be guaranteed.

Further, an outer wall of the shaft shoulder retainer 311 and an outer wall of the retainer nut 9 are each provided with a limiting surface 10. In an example, a peripheral surface of the shaft shoulder retainer 311 and a peripheral surface of the retainer nut 9 each are in a shape of a regular polygon, forming a plurality of limiting surfaces 10 similar to an outer side of the nut, which facilitates disassembly by using tools.

A middle portion of the retainer nut 9 is provided with a through hole for the extension rod 33 to pass through, an outer side of an end portion of the hollow shaft 31 and the inner side of the retainer nut 9 each are provided with a mating surface 20, and the retainer nut 9 is assembled with external threads of the hollow shaft 31. When the assembly is in place, the mating surfaces 20 of the hollow shaft 31 and the retainer nut 9 match each other, so as to position a center of the retainer nut 9, thereby functioning as a sliding bearing, which provides support for the extension rod 33 to prevent deflection of the extension rod 33, thereby improving overall reliability.

The above are merely embodiments of the present invention. It should be noted that those of ordinary skill in the art can make improvements without departing from the creative concept of the present invention, but all of these improvements shall fall within a scope of the present invention.

What is claimed is:

1. A planetary roller screw linear actuator, comprising:
   a shell having a receiving cavity;
   a driving assembly fixed in the receiving cavity; and
   a rotor received in the receiving cavity and driven by the driving assembly to rotate, the rotor comprising a hollow shaft rotatably connected to two ends of the shell, a planetary screw rotating body in transmission connection to the hollow shaft, and an extension rod in transmission connection into the planetary screw,
   wherein the hollow shaft is made of a magnetic material, the linear actuator further comprises: a detection position magnet fixed to an end of the hollow shaft away from an extension direction of the extension rod, and an induction assembly fixed to the shell and spaced apart from the detection position magnet; and an axial projection of the detection position magnet is located in the hollow shaft;
   wherein the rotor further comprises a shaft end support fixed to an end of the hollow shaft, the shaft end support is made of a non-magnetic material, and the detection position magnet is fixed to the shaft end support, the shaft end support is embedded into an end of the hollow shaft, the detection position magnet is embedded at a middle portion of the shaft end support.

2. The planetary roller screw linear actuator as described in claim 1,
   wherein the detection position magnet at least partially extends into the hollow shaft.

3. The planetary roller screw linear actuator as described in claim 1,
   wherein the linear actuator further comprises a bearing bracket fixed to an end of the shell, and a first bearing comprising an outer ring that is fixed to the bearing bracket and an inner ring that sleeves and is fixed to an outer side of the hollow shaft; and
   wherein the induction assembly comprises a printed circuit board (PCB) fixed to the bearing bracket, and a magnetic field induction position sensor fixed to the PCB.

4. The planetary roller screw linear actuator as described in claim 3,
   wherein an inner side of the bearing bracket is provided with an embedding groove, and the first bearing is embedded in the embedding groove with an outer side of the first bearing abutting against a groove wall of the embedding groove; and
   wherein the linear actuator further comprises a first end cap fixed to the shell and abutting against a side of the bearing bracket away from the rotor.

5. The planetary roller screw linear actuator as described in claim 4, wherein the bearing bracket has a hollow structure, the first end cap is provided with an outlet hole communicated with the receiving cavity, the driving assembly comprises a plurality of windings; wires of the windings are led out through the outlet hole, and an edge of the outlet hole protrudes outwards to form a reinforced edge.

6. The planetary roller screw linear actuator as described in claim 5, wherein the bearing bracket is provided with a plurality of through holes surrounding an outer side of the PCB and spaced apart from one another.

7. The planetary roller screw linear actuator as described in claim 1,
   wherein the linear actuator further comprises a second bearing and a second end cap; and
   wherein the second bearing comprises an inner ring that sleeves an outer side at an end of the hollow shaft close to the extension side of the extension rod and an outer ring that is fixed to the shell, and the second end cap is fixed to an end of the shell and abuts against an outer side of the second bearing.

8. The planetary roller screw linear actuator as described in claim 7, wherein the hollow shaft protrudes radially to form a shaft shoulder retainer surrounding an outer side thereof, the inner ring of the second bearing abuts against an outward side of the shaft shoulder, and the linear actuator further comprises a retainer nut that is fixed to an end of the hollow shaft and abuts against a side of the inner ring of the second bearing away from the shaft shoulder retainer.

9. The planetary roller screw linear actuator as described in claim 8, wherein an outer wall of the shaft shoulder retainer and an outer wall of the retainer nut are each provided with a limiting surface.

10. The planetary roller screw linear actuator as described in claim 8, wherein a middle portion of the retainer nut is provided with a through hole for the extension rod to pass through, an out side of an end portion of the hollow shaft and inner side of the retainer nut each are provided with a mating surface, and the retainer nut is assembled with external threads of the hollow shaft, the mating surfaces of the hollow shaft and retainer nut match each other.

* * * * *